D. C. Ripley,
Glass Mold.

N° 83,210.                              Patented Oct. 20, 1868.

Witnesses.
Thos. B. Kerr.
R. C. Wrenshall.

Inventor.
Daniel C. Ripley,
by Bakewell & Christy
his Att'ys.

United States Patent Office.

DANIEL C. RIPLEY, OF BIRMINGHAM, PENNSYLVANIA.

Letters Patent No. 83,210, dated October 20, 1868

IMPROVEMENT IN MANUFACTURE OF GLASS-WARE.

The Schedule referred to in these Letters Patent and making part of the same.

*To all whom it may concern:*

Be it known that I, DANIEL C. RIPLEY, of Birmingham, in the county of Allegheny, and State of Pennsylvania, have invented a new and useful Improvement in Manufacture of Glass-Ware; and I do hereby declare the following to be a full, clear, and exact description thereof, reference being had to the accompanying drawing, making a part of this specification, in which—

Like letters of reference indicate like parts in each.

Figure 1:
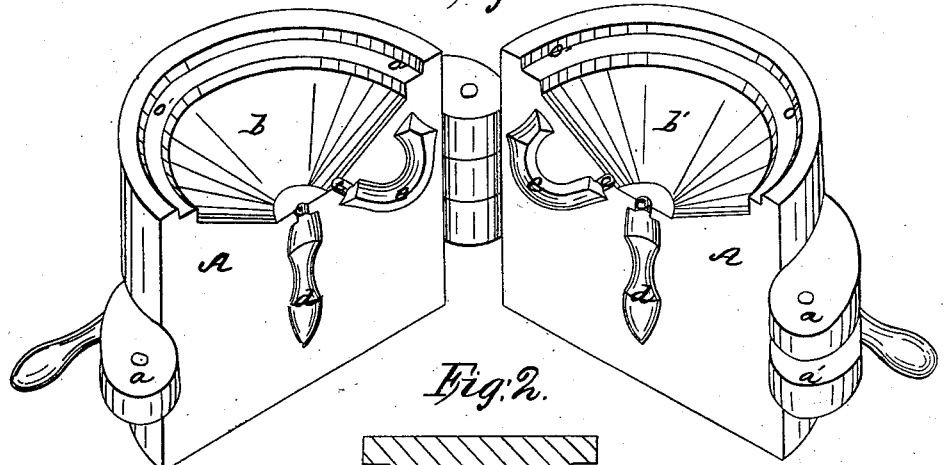
Figure 1 is a perspective view, showing the inner face of a jointed or two-part glass-mould, illustrative of my improvement.

In the manufacture of glass stoppers, and other small articles of pressed glass-ware, a mould has been used in which a number of such articles could be pressed at once, the cavity or mould for each article being connected by sprues with a pressing-fount, into which the melted glass is dropped or poured, and from which it is pressed by a plunger.

As more glass must necessarily be used than is required for the articles to be manufactured, a quantity is left in the pressing-fount, which, to the extent of the cost of its manufacture is almost a total loss. My invention utilizes this waste, by so making the mould that the pressing-fount shall itself be the cavity or mould in which to press articles of value, and shall be connected by sprues with other cavities, one or more, for forming the same or other articles of glass-ware; and therein consists the nature of my invention.

To enable others skilled in the art to make and use my invention, I will proceed to describe its construction and mode of operation.

A A' are the two halves of a jointed or two-part glass-mould, jointed in the usual way, and, when closed, locked by a pin passing through the lugs $a\ a'$. In the upper part of this mould, I make a pressing-fount, $b\ b'$, of the shape of a lamp-foot, or some other useful or ornamental article of pressed glass-ware, and connect such pressing-fount or cavity, by sprues $c$, with one or more other cavities, $d\ e$, which are of the proper form for moulding the same or other articles of pressed glass-ware.

In the drawing, $b\ b'$ is a cavity of the proper form for moulding the foot of a lamp; $e$ is the cavity for a lamp-handle; $g$ and $d$, a cavity for a glass stopper, $h$.

The sprues $c$ may connect at each end with those parts of the moulds in which are cast the unfinished faces of the articles to be made, or otherwise, as may be preferred.

The mould A A' being closed, a shouldered collar, B, is placed in its upper open end. The annular part, $i$, of this collar projects out over the upper end of the mould A A'. The tubular part, $o$, has a small amount of vertical play in the cylindrical cavity $o'$, so that by being more or less displaced, room will be provided beneath it, and inside the cavity $b\ b'$, for a slight excess in the amount of glass over and above what is required for a lamp-foot, $f$, or other article to be made therein.

Figure 2:
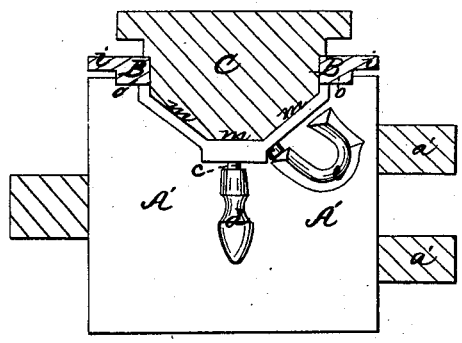
Figure 2 is a face view of one of the halves of such a mould, with the collar and plunger shown in section.
Figure 3:
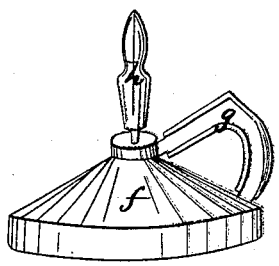
Figure 3 is a perspective view of the articles as made in the mould shown.

The workman then gathers, on his punty-rod, the amount of glass required, as near as may be, to make all the articles, $f\ g\ h$, which the mould A A' is designed to make, drops the glass into the cavity $b\ b'$, and immediately applies to it the plunger C, attached to a suitable pressing-device, which descends through the collar B, the exterior diameter of the plunger C being the same as the interior diameter of the collar B, and the lower face, $m$, of the plunger C being of the form which it is desirable to give to the under and inner face of the lamp-foot $f$. The melted glass runs readily through the sprues $c$ into the cavities $d\ e$, and pressure applied to the plunger C forces the surplus of glass into the shape of a lamp-foot, as shown in fig. 2. The mould A A' is opened as soon as the glass is set, and the articles $f\ g\ h$ removed. These are broken apart immediately, or afterwards, as may be preferred. A globe can be blown on to the lamp-foot $f$, the handle, $g$, attached to it, or to any article requiring a handle, and the stopper $h$ is appropriated to the use designed.

In the construction of the compound mould described, I do not limit myself to any particular number or kind or variety of cavities, $b\ c\ d$, but apply my invention to the construction of moulds combining two or more cavities for making the same or different articles, one such cavity being the pressing-fount.

Nor do I limit myself in the shape of the cavity $b\ b'$, which constitutes the pressing-fount, but I make such cavity of the shape of either face or part of an article of glass-ware which is made, or which can conveniently be made by pressing, the lower end of the plunger C being so shaped as to form the other face. The other articles made may be connected with any convenient part of the article produced in such pressing-fount; and, if with some part which should be finished, such finishing may be done after the articles are broken apart, by grinding or otherwise.

Instead of a double mould, A A', a triple or quadruple mould may be employed, if preferred.

In this way I make a number of articles with the labor required to make each one separately, and utilize the glass commonly wasted in the pressing-fount; and, as the cost of preparing the glass for melting amounts to about fifty per cent. of the value of the manufactured article, the saving in a large manufactory will amount to a large sum.

What I claim as my invention, and desire to secure by Letters Patent, is—

The construction of a compound mould for making articles of pressed glass-ware, substantially as described, in which the pressing-fount shall itself be a mould, and shall at the same time be connected by a sprue or sprues with another mould, or with other moulds, for forming the same or other articles of glass-ware.

In testimony whereof, I, the said DANIEL C. RIPLEY, have hereunto set my hand.

DANIEL C. RIPLEY.

Witnesses:
A. S. NICHOLSON,
G. H. CHRISTY.